Patented Oct. 9, 1923.

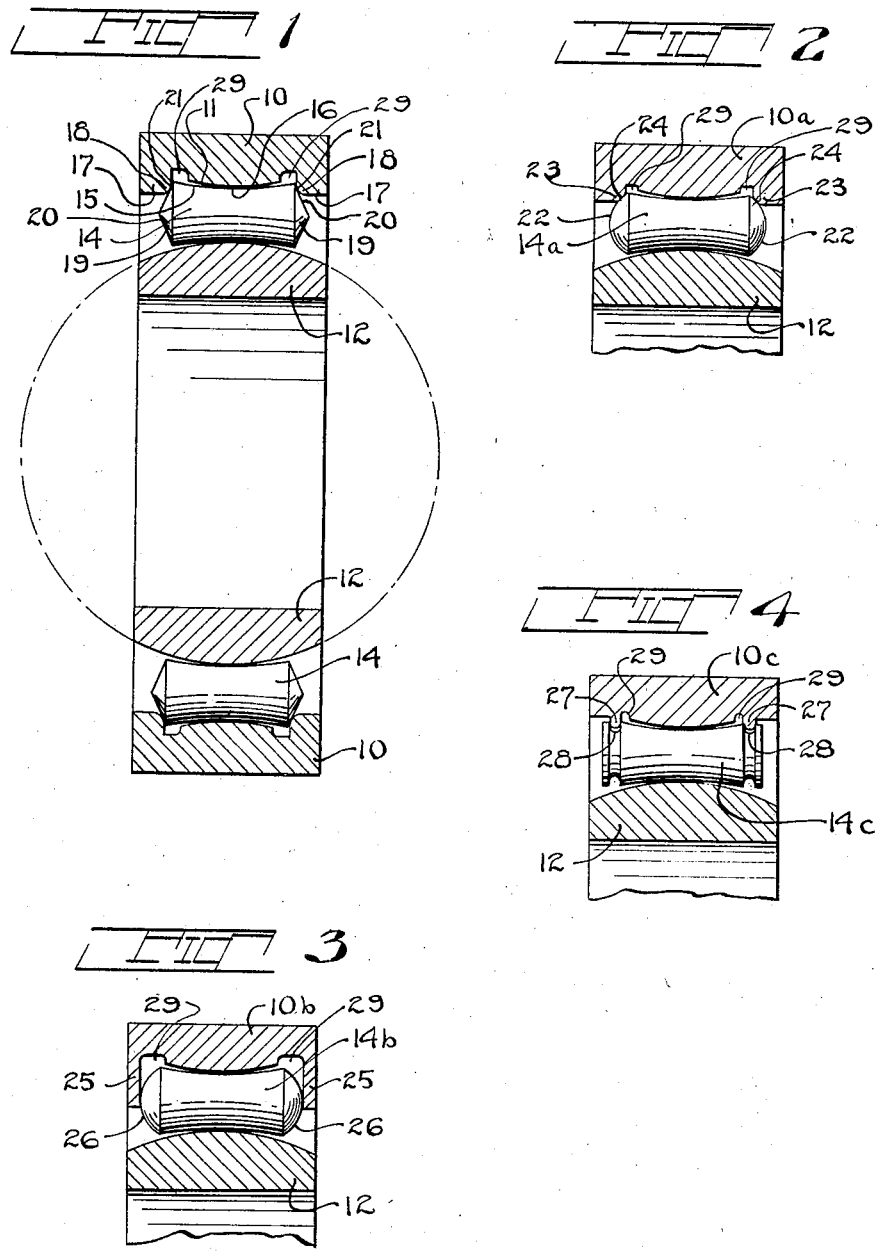

1,469,991

UNITED STATES PATENT OFFICE.

PERCY A. E. ARMSTRONG, OF LOUDONVILLE, NEW YORK.

MEANS FOR PREVENTING DISPLACEMENT OF ROLLERS IN ROLLER BEARINGS.

Application filed September 28, 1920. Serial No. 413,338.

*To all whom it may concern:*

Be it known that I, PERCY A. E. ARMSTRONG, a subject of the King of Great Britain, and residing at Loudonville, in the county of Albany, State of New York, have invented certain new and useful Improvements in Means for Preventing Displacement of Rollers in Roller Bearings, of which the following is a specification.

My invention relates to means for preventing displacement of rollers in roller bearings. The invention relates more particularly to roller bearings having rollers with curved surfaces, and having at least one bearing member provided with a curved bearing surface.

With curved rollers, which have different diameters in different parts of their length, lengthwise displacement thereof relative to a curved bearing surface may result in the introduction, between parts of the bearing rings or members, of a roller section having a diameter greater than the available space. In this way binding or seizing or even breakage of the bearing may result. This tendency becomes more marked as the difference between the curvature of rollers and races is increased.

The present invention has for its object the provision of means for preventing such displacement of the rollers with respect to the bearing members.

In the accompanying drawings I have shown an embodiment of my invention in which the curve of the rollers is concave and a single row of rollers is made use of, but it is to be understood that the invention is not limited to the form selected for illustration and for giving an understanding of the principle involved.

In said drawing Fig. 1 is a central sectional view of a bearing embodying one form of the invention and Figs. 2, 3 and 4 are detail sectional views of some modified forms.

The bearing illustrated has an outer bearing ring 10, with curved bearing surface 11, and an inner bearing ring 12, with a spherical bearing surface. The rollers 14 have the concaved surface 15 with a curvature somewhat greater than the curvature of the bearing member and adapted to make contact with the bearing surfaces of the bearing members in a narrow zone, region or point. When the bearing is under substantial load such bearing region is increased in width as compared to the condition when not under load, this being due to the elasticity of the metal and such slight "give" as takes place under load, which results in distributing the load over a wider area. This relation may be referred for convenience of statement as point contact when not under load, and line contact under load. The line contact under load is, however, not of sufficient length to produce appreciable departure from rolling contact over the entire bearing area nor to result in appreciable sliding action between the surfaces. As will be apparent, the greatest pressures are imposed at and near the center of the line contact area when under load and the contact pressures decrease on either side thereof as the edges or limits of the line contact area are approached.

The means for preventing longitudinal displacement of the rollers in the form shown is provided on the outer bearing ring or member. In Fig. 1 such outer bearing member 10 is provided with inwardly extending flanges 17 which are provided with an outward flare or taper 18, adapted to bear against the end of the roller 14 which is provided with extensions 19 having a similar flare or taper 20. The line of contact 21 is preferably substantially opposite, or in other words at substantially the same radial distance from the bearing center as the bearing region 16 of the roller 14 on the outer bearing member 10, making any contact between the roller and the flange a substantially rolling contact.

The slightly modified form of Fig. 2 has the ends of the rollers 14ª rounded off as shown at 22 and the flanges 23 on bearing member 10ª having contact surfaces 24 of rounded form to cooperate therewith.

In the form shown in Fig. 3, the bearing ring 10ᵇ has longer flanges 25 adapted to bear centrally against the rollers 14ᵇ, here shown as provided with rounded end portions 26.

In the form shown in Fig. 4 the bearing member 10ᶜ is provided between its sides with a pair of inwardly extending flanges 27, which enter grooves 28 in the roller 14ᶜ.

In all cases relief grooves 29 are preferably cut in the bearing member on each side of the bearing surface so that there shall be no contact between the roller and the bearing member in such region.

It will be seen that the invention provides simple and efficient means for guarding against binding or seizing of the bearing by preventing the longitudinal movement or displacement of the rollers relative to their bearing surfaces. The invention may be embodied in various forms and is not limited to the particular embodiment illustrated.

I claim:

1. In a roller bearing, curved rollers having axially projecting portions at their ends, inner and outer bearing members having curved bearing surfaces, and relatively broad flanges on the outer bearing member adapted to make substantially axial engagement with the ends of the rollers and to thereby prevent longitudinal displacement thereof relative to the bearing members.

2. In a roller bearing, curved rollers, inner and outer bearing members, the inner bearing member being spherical, and means on the outer bearing member adapted to engage with the rollers at substantially the axes thereof to prevent longitudinal displacement thereof with respect to the outer bearing member.

3. In a roller bearing, curved rollers having substantially axially extending portions at their ends, inner and outer bearing members, the outer member having curved bearing surfaces, and means on the outer bearing member for engaging said rollers by their ends at substantially the axes thereof to prevent longitudinal displacement thereof.

In witness whereof I have signed my name hereto.

PERCY A. E. ARMSTRONG.